Figure 1:
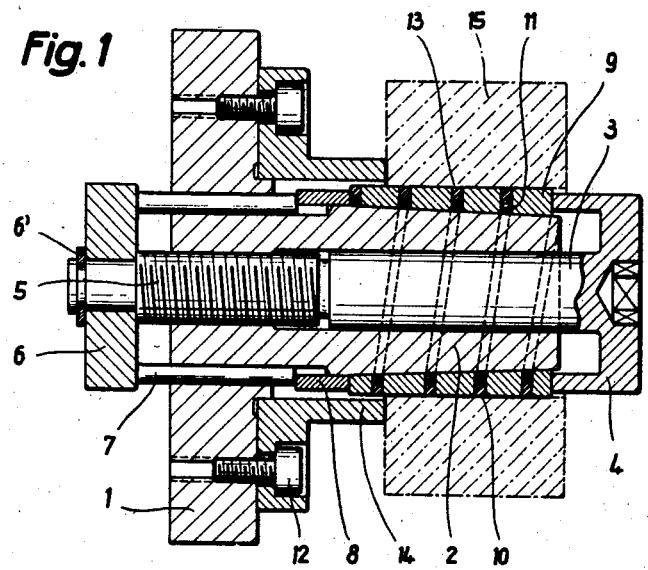

July 7, 1959   J. B. FRÖHNER   2,893,742
CLAMPING DEVICES OR COUPLINGS
Filed April 26, 1955

INVENTOR
JOHN BAPTIST FROEHNER
BY Richards & Geier
ATTORNEYS

United States Patent Office 2,893,742
Patented July 7, 1959

2,893,742

CLAMPING DEVICES OR COUPLINGS

Johann Baptist Fröhner, Mannheim-Feudenheim, Germany

Application April 26, 1955, Serial No. 503,932

Claims priority, application Germany April 30, 1954

5 Claims. (Cl. 279—2)

The invention relates to clamping devices or couplings, such as arbors.

Various kinds of clamping devices are known, with the aid of which work pieces or tools are clamped in their bore on mandrels or are clamped in at the outer diameter by chuck clamping in order to carry out a machining on machine tools. In the case of the known kinds of these clamping devices for internal or external clamping, clamping elements are employed which can fundamentally be classified in two groups.

In the case of one group of the known clamping elements, the part which comes into contact directly with the part to be clamped consists of a closed sleeve of elastic material, which sleeve is deformed by mechanical or hydraulic forces, which act internally on internal clamping, and externally on external clamping, in order to bring about, in the former case, an increase of the external diameter and, in the latter case, a reduction of the internal diameter of the sleeve, and, by means of this increase or reduction, to produce a non-positive connection with the parts to be clamped.

In the case of the second known group of clamping elements for mandrel clamping or chuck clamping, sleeves are employed which are provided with longitudinal slits and to which, in the case of clamp mandrels, an axial displacement in relation to the receiving member is imparted by an internal cone and, in the case of collet chucks, an axial displacement is imparted by an external cone, in order, in this way, to effect a widening or a compression of the sleeve and thus to produce the non-positive connection between the clamping element and the part being clamped.

The first mentioned group is limited in its chuck capacity by the deformation limit of the material employed. In contradistinction, it has the advantage that it renders it possible to obtain greater accuracy of revolution.

The second group has the advantage of a greater chuck capacity, but has the disadvantage of smaller accuracy of revolution, which is caused by the fact that the clamping sleeve or the chuck is or are divided into segments by the slits which extend axially, the radius of curvature of the segments agreeing, in only one position, with the radius of curvature of the receiving member or of the part being clamped. A displacement axially from this position results only in linear contact.

The object and aim of the present invention is the production of a novel clamping element for clamping devices and couplings, in which the advantages of the aforesaid known kinds of clamping elements are combined and their disadvantages are obviated at the same time. For this purpose, the invention starts from a clamping or coupling device, in which the clamping operation is carried out by axial displacement of a clamping sleeve, which is provided with a conical surface that is concentric with the gripping surface, in relation to a mandrel member or chuck member that is provided with a conical surface of equal inclination which is likewise concentric with the gripping surface, and consists principally in the fact that the clamping sleeve has one or more helically extending separating slits. This or these separating slit or slits effects or effect a full contact of the clamping surface with the gripping surface and thus constant great accuracy of revolution is ensured. At the same time, a considerable capacity for changing shape and, consequently, a large clamping range are obtained owing to the helical course of the separating slit.

For the purpose of illustrating the invention, there are represented, in the accompanying drawings, two examples of clamping devices constructed in accordance with the invention.

Figure 2:
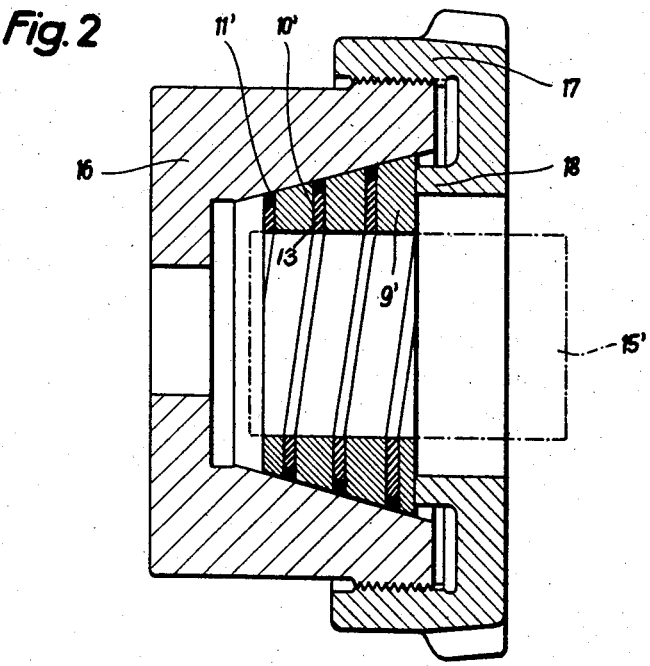

Fig. 1 is an axial section through a clamping device for internal clamping or mandrel clamping with a clamping sleeve according to the invention and Fig. 2 is a corresponding section through a clamping device for external clamping or chuck clamping.

In the clamping device represented in Fig. 1, 1 is a disc-shaped carrier with an axial continuation or mandrel 2, the peripheral surface of which tapers conically towards the end. Arranged in a central bore of the carrier 1, 2 is a bolt 3 which, at its end, that projects beyond the end face of the mandrel 2, is in the form of a cap 4. Near its other end, the bolt 3 has a screw-threaded part 5. On the end part of the bolt 3 there is mounted a disc 6 which is secured axially by a spring ring 6'. Resting against the disc 6 are a number of pins 7 which project through bores in the carrier 1. The other ends of the pins 7 rest against the end face of a ring 8.

Arranged on the conical continuation or mandrel 2, between the ring 8 and the cap-shaped end 4 of the bolt 3, is a clamping sleeve 9 with a conical internal surface, which, according to the invention, has a helical separating slit 10. In the case of the embodiment represented, the separating slit 10 has a certain width, so that the helical turns of the clamping sleeve 9, which are formed by the separating slit, are axially spaced apart, the surfaces, which are opposite each other, of the helical turns being parallel or approximately parallel to each other. The interspace between the turns is bridged by one or more insertions, in the present case by a helical spring 11 inserted into the separating slit 10. In addition, an elastic packing 13, for example of rubber, is advantageously arranged in the separating slit 10 for the purpose of preventing the penetration of dirt to the outer periphery of the clamping sleeve 9.

Fixed to the carrier 1 by means of bolts 12 is a sleeve 14 which is provided with a flange and which serves as a stop for the work piece 15 which is to be clamped on the clamping sleeve 9.

In order to clamp the work piece 15 on the clamping sleeve 9, the bolt 3 is turned and, in this way, an axial pressure is exerted on the clamping sleeve 9 and effects a displacement of the clamping sleeve 9 on the conical surface of the mandrel 2. The transmission of pressure from the first to the last turn of the clamping sleeve 9 is ensured by the inserted helical spring 11. Owing to the displacement on the mandrel 2, the clamping sleeve 9 is widened and a non-positive connection with the work piece 15 is produced, the clamping sleeve 9 being, on the outer periphery, fully in contact with the work piece.

In the clamping device for external clamping represented in Fig. 2, the clamping sleeve 9' is conical on its outer surface and rests in a conical bore in a carrier or chuck member 16. The clamping sleeve 9' has, similarly to the embodiment shown in Fig. 1, a helical separating slit, into which a helical spring 11' is inserted. For the axial displacement of the clamping sleeve 9' there is employed a cap-shaped part 17 which is screwed on the carrier 1 and rests, with the end face of its flange 18, against the end faces of the clamping sleeve 9'. The displacement which is effected by rotating the part 17 produces a reduction of the internal diameter of the clamping sleeve 9' and, consequently, a non-positive connection with the work piece 15' that is to be clamped in, there being again full contact between the clamping sleeve and the work piece.

The construction of the clamping sleeve according to the invention renders possible, while maintaining a full contact, a considerable increase in the external diameter or reduction in the internal diameter of the clamping sleeve, so that a greater clamping range is available.

The helical separating slit may be produced by, for example, tapping a continuous groove in the sleeve in a similar manner to screw-cutting. The clamping sleeve may also be constructed in such a manner that the turns, which are produced by the helical separating slits, lie close together, i.e., are juxtaposed. In that case, the production of the clamping sleeve can be effected by helically winding a steel strip.

The clamping element constructed in accordance with the invention is not limited in its application to clamping devices for work pieces or tools but may also be employed in friction couplings and similar devices in which a non-positive connection between two parts is to be produced.

What I claim is:

1. An arbor for clamping a cylindrical part, said arbor comprising a body having a coaxial frusto-conical surface, a radially distortable clamping sleeve having a frusto-conical surface of the same apex angle as the first-mentioned frusto-conical surface and mounted on said body with said frusto-conical surfaces in face-to-face contact, said clamping sleeve having a cylindrical gripping surface coaxial of the second-mentioned frusto-conical surface and at least one helical separating slit extending from end to end of the sleeve and entirely through the wall of the sleeve, whereby turns are formed in said sleeve, means to displace the body and the sleeve axially relative to each other to distort the sleeve radially and thereby grip the part and at least one insertion bridging the interspace between the individual turns in said sleeve, said insertion spacing said turns apart by a constant distance.

2. An arbor as claimed in claim 1, in which the insertion is a helical spring.

3. An arbor as claimed in claim 1, in which there is an elastic packing closing the said slit and located within said slit adjacent to the external surfaces of said sleeve.

4. An arbor as claimed in claim 1, wherein the first-mentioned frusto-conical surface is an outer surface of said body, wherein the second-mentioned frusto-conical surface is an inner surface of said sleeve, and wherein said cylindrical gripping surface is an outer surface of said sleeve.

5. An arbor as claimed in claim 1, wherein the first-mentioned frusto-conical surface is an inner surface of said body, wherein the second-mentioned frusto-conical surface is an outer surface of said sleeve, and wherein said cylindrical gripping surface is an inner surface of said sleeve.

References Cited in the file of this patent

UNITED STATES PATENTS

| 1,944,255 | McFall et al. | Jan. 23, 1934 |
| 2,282,676 | Pigott | May 12, 1942 |
| 2,612,376 | Wollner | Sept. 30, 1952 |